United States Patent [19]

Ritter

[11] Patent Number: 4,921,921

[45] Date of Patent: May 1, 1990

[54] MELTABLE AEROBICALLY CURED PLASTIC COMPOSITIONS

[75] Inventor: Wolfgang Ritter, Hilden, Fed. Rep. of Germany

[73] Assignee: Henkel Kommanditgesellschaft auf Aktien, Duesseldorf, Fed. Rep. of Germany

[21] Appl. No.: 868,368

[22] Filed: May 23, 1986

[30] Foreign Application Priority Data

May 25, 1985 [DE] Fed. Rep. of Germany ....... 3518965

[51] Int. Cl.⁵ .............................................. C08C 33/00
[52] U.S. Cl. .................................... 526/195; 526/196; 526/197; 526/198
[58] Field of Search ................ 526/195, 196, 197, 198

[56] References Cited

U.S. PATENT DOCUMENTS

| | | | |
|---|---|---|---|
| 2,985,633 | 5/1961 | Welch | 526/197 |
| 3,128,254 | 4/1964 | D'Alelio | 526/196 |
| 3,130,185 | 4/1964 | Welch | 526/196 |
| 3,238,186 | 3/1966 | Schultz | 526/196 |
| 3,501,689 | 8/1962 | Zutty | 526/196 |
| 4,153,769 | 5/1979 | Halm | 526/196 |
| 4,167,616 | 9/1979 | Bollinger | 526/197 |
| 4,381,386 | 4/1983 | Ritter et al. | 526/239 |
| 4,385,153 | 5/1983 | Ritter | 524/522 |
| 4,515,724 | 5/1985 | Ritter | 260/410 |
| 4,626,310 | 12/1986 | Ritter | 526/196 |

*Primary Examiner*—Joseph L. Schofer
*Assistant Examiner*—Peter D. Mulcahy
*Attorney, Agent, or Firm*—Ernest G. Szoke; Wayne C. Jaeschke; Henry E. Millson, Jr.

[57] ABSTRACT

Hotmelt adhesives which, after heating, are capable of polymerization under the effect of atmospheric oxygen and which essentially consist of a solid reactive component containing at least one polymerizable ethylenic C=C double bond and a polymerization-initiating organoboron compound and, if desired, other standard auxiliaries.

38 Claims, No Drawings

MELTABLE AEROBICALLY CURED PLASTIC COMPOSITIONS

BACKGROUND OF THE INVENTION

Reactive adhesives based on polymerizable systems of the methacrylate adhesive type are normally marketed and applied in two-component form. It is only in use that the polymerizable component is mixed or otherwise suitably contacted with the hardener. The usual hardener systems contain peroxide-amine combinations as initiators for the radically initiated hardening reaction.

It is also known that suitable organoboron compounds act as reaction initiators under the effect of atmospheric oxygen in polymerizable systems containing double bonds. Thus, U.S. Pat. No. 4,381,386 describes two-component reactive adhesives in which non-inflammable organoboron compounds, particularly boron alkyl compounds, perform the initiator function. Two-component reactive adhesives which are based on boron alkyl compounds such as these as initiators, but which are applied in the form of so-called no-mix adhesives, are also described in European Patent Application No. 78,995. The disadvantage of all systems based on boron alkyl compounds as polymerization initiators lies in the inadequate stability of the boron alkyl compounds in storage on account of their high reactivity to oxygen. This also makes them difficult to handle in use.

Proposals to stabilize reactive boron compounds by mixing them or even by reacting them with oligomeric and/or polymeric components which are spreadable to solid at normal temperature and the use of polymerization initiators based on organoboron compounds stabilized in this way are the subjects of published European Patent Application Nos. 85,836; 84,805; 87,708 and 78,994. The handling of two-component reactive compositions, i.e. for example corresponding acrylatebased adhesives, is made very much easier in this way.

According to European Patent Application No. 51,796, however, it is also possible to formulate one-component curable (meth)acrylate adhesives using boron alkyls which react with atmospheric oxygen in a radical chain reaction. These aerobically curing (meth)acrylate adhesives are mixtures spreadable to fluid under normal conditions, particularly at room temperature, of (a) suitable radically polymerizable monomers.
(b) suitable polymers which influence the rheology of the uncured adhesive as required and provide for elasticity and flexibility in the cured adhesive film,
(c) suitable boron alkyl as radical formers in the presence of air and,
(d) stabilizers, inhibitors and accelerators.

These multi-component mixtures have to be prepared and also stored in the complete absence of oxygen. When they come into contact with air on leaving the pack, the radical polymerization reaction (curing of the adhesive) is initiated. Despite favorable application properties and the advantage of a "one-package" formulation, the comparatively high cost of production in the complete absence of oxygen and, above all, the corresponding storage of one-component formulations of the type in question have hitherto been obstacles to their utilization in practice.

Another known class of adhesives are the storage-stable hotmelts which are widely used in practice. They are applied after melting of the polymer composition which is solid at room temperature, for example using the melt applicator guns known in the do-it-yourself field. The molten adhesive establishes the bond and fills the joint, hardening again on cooling. However, bonds established in this way are not heat-resistant.

Another known class of reactively hardening compositions, which are used not only as adhesives but also as cast resins, molding compounds and gap-filling compounds and the like, are the moisture-curing polyurethane systems which are generally used as one-component systems and which cure under the effect of atmospheric moisture. The desired three-dimensional crosslinking and, hence, the transition to the solvent-resistant and a no longer meltable state occurs during their application.

DESCRIPTION OF THE INVENTION

Other than in the operating examples, or where otherwise indicated, all numbers expressing quantities of ingredients or reaction conditions used herein are to be understood as modified in all instances by the term "about".

An object of the present invention is to provide one-component reactive compositions based on radically polymerizable systems which, if desired, may be exposed to air under normal conditions without hardening. Nevertheless, initiation of the reaction does not require mixing with a separately stored hardener component. The reactive compositions of the invention can be simply applied with forming, in the same way as known hotmelts. The molding composition is cured, more especially crosslinked, by polymerization initiation during the forming or rather the bonding process in the absence of any further measures, resulting in the formation of shaped structures, for example bonds having improved heat resistance and, more especially, bonds which can no longer be melted. More specifically, the invention seeks to provide aerobically curing one-component adhesive systems which, although also having to be produced in the substantial absence of oxygen, do not require oxygen-tight packs and pack closures for storage.

The invention is based on the unexpected observation that, under certain conditions, one-component reactive compositions can be provided which show virtually unlimited stability in storage under normal conditions and, more especially, at room temperature or at only moderately elevated temperatures, and if desired even in the presence of air, but which at the same time are capable of aerobically curing. To initiate this hardening reaction, it is only necessary to heat the composition in the presence of air until it softens or melts, so that, for example in the adhesives field, the new mixtures of the invention develop their adhesive effect and, at the same time, reactively cure simply by application under the influence of heat. Under normal conditions, the new systems are solid mixtures containing organoboron compounds as starters and olefinically unsaturated compounds aerobically polymerizable therewith.

In a first embodiment, therefore, the present invention relates to solid plastics compositions (hotmelt adhesives, cast resins, molding compounds) based on polymerizable olefinically unsaturated compounds and an initiator system for initiating polymerization which are solid, stable in storage under normal conditions, even in the presence of air, soften to a spreadable or fluid consistency under the effect of heat and which are curable by polymerization, wherein these mixtures are in the form of a one-component system which is solid at room temperature, which softens on heating and which is aerobically reactive under these conditions. The compositions of the invention are intimate solids mixtures prepared in the absence of oxygen of (a) at least one reactive component containing at least one polymerizable ethylenic C=C double bond;

(b) at least one organoboron compound capable of initiating the polymerization of the ethylenically unsaturated compounds of component (a); and (c) optionally, a polymer compound having a melting or softening range of from 50° to 350° C. suitable as a hotmelt component;

(d) anionic and/or radical polymerization inhibitors or stabilizers;

(e) other auxiliaries, such as thickeners, flow promoters, levelling aids, accelerators, fillers, dyes, pigments and the like; provided that if (a) and (b) do not together form a solid mixture at room temperature, then component (c) must be present in an amount sufficient to result in a solid mixture of components at room temperature.

Preparation of the compositions of the invention is carried out by mixing aerobically polymerization-initiating organoboron compounds in the absence of oxygen with the polymerizable, ethylenically unsaturated components and the other components used, if any, so thoroughly that high proportions of the organoboron compounds in the solids mixture ultimately obtained are protected against premature reaction by atmospheric oxygen. At the same time, the choice of the components of the mixture as a whole ensures that the mixtures are solid at room temperature and at least even at moderately elevated temperatures. However, these solid mixtures must be capable of being softened, and, in particular, melted at technically practicable temperatures. It is in this state that they are applied with forming (where they are used as hotmelts for example, they are applied by expressing the melt, by spreading and/or by gap filling). At time same time, however, the aerobic reaction-initiating process and, hence, setting or rather curing take place with simultaneous or subsequent cooling.

In a preferred embodiment, the reactive plastics compositions of the invention have a melting point or rather a glass transition temperature ($T_g$) to the softened or fluid state above 45° C. These phase transition temperatures are preferably at least 60° C. or higher, for example at 70° C., 80° C., 90° C. or even at least 100° C. The higher this temperature in the solid mixture, the safer its stability in storage against unintentional increases in temperature, for example during storage in sunlight.

According to the invention, the state of intimate admixture is achieved by combining the principal reaction components in the absence of oxygen via the melt phase of at least one of the constituents of the mixture. In particular, the organoboron compounds (b) are introduced into the reactive ethylenically unsaturated components (a) preferably in the form of a melt. In important embodiments described in detail hereinafter, preformed polymers are used as a possible component (c). According to the invention, it is preferred in that case, where the solid mixtures are prepared in the absence of oxygen, to form a melt phase of the reactive constituents (a) and the polymer components (c) into which any inhibitors used (component (d)) and any other additives belonging to component (e) are introduced and with which the organo-boron compounds are finally mixed.

The subsequent cooling of these mixtures combined in the melt also takes place in the absence of oxygen. The melt mixtures can be transferred beforehand into intermediate containers or even into final packages intended for marketing.

If the multicomponent mixture is cooled to below its melting point or rather the $T_g$ in the mixture, the potentially aerobically curing hotmelts of the invention in a preferred embodiment are stable in storage, even in the presence of air. $T_g$ is understood here to be the temperature at which the multicomponent mixture is crystalline, partly crystalline or glass like, but no longer free-flowing under any circumstances. The solid hotmelts may be ground or otherwise size-reduced, for example in the presence of air, or even formed under pressure into shapes. When the reactive compositions are melted for application, the cross-linking reaction takes place in the presence of air. In other embodiments of the invention, the solidified multicomponent melt is kept in packs pending use which at least largely prevents the entry of air and/or moisture; the reactive compositions only being brought into contact with air with softening or melting when it is intended to apply them.

The choice of suitable special components from classes (a) to (e) of the reactive plastics compositions of the invention can be made from a wide selection providing the temperature/phase behavior required in accordance with the invention is guaranteed. The homogeneous multicomponent mixture which is preferably prepared in the melt in the absence of oxygen must have a $T_g$ of at least 45° C. and preferably of at least 60° C. Taking this requirement into consideration, suitable multicomponent mixtures may be made up from the relevant prior literature on aerobically reacting reactive compositions catalyzed by organoboron compounds and more especially from the prior European Patent Application Nos. 51,797; 51,796; 78,995; 85,902; 84,805; 86,401; and 78,994 which were discussed above.

In preferred embodiments, all of the individual components or at least the majority of the components used are solid at room temperature and preferably even at temperatures up to the required $T_g$. However, it is also possible to use liquid components providing a solid multicomponent mixture having the required minimum $T_g$ is formed by the homogeneous mixing process via the melt phase with subsequent cooling in the absence of oxygen. Taking these requirements into account, the individual components can be selected from the following materials:

Mixture component (a):

Polymerizable constituents suitable for use in the plastics compositions of the invention can be any of the many known compounds containing a polymerizable ethylenic double bond which are normally used, for example, in cast resins, fillers and, more especially, in reactive adhesives. Accordingly, particularly suitable constituents of this type are esters of acrylic and/or α—substituted acrylic acids, such as methacrylic acid—hereinafter referred to as (meth)acrylic acid— with monohydric or polyhydric, and more especially dihydric alcohols. However, other known derivatives or (meth)acrylic acid, more especially the corresponding acid amides, which may be substituted on the amide nitrogen, for example by hydrocarbon radicals, e.g. $C_1$-$C_{10}$ alkyl groups, are also suitable. Other possible substitutents in the α—position of the (meth)acrylic acid derivatives are, for example, halogen, particularly chlorine and/or bromine, cyano, or, preferably, alkyl groups containing up to 10 carbon atoms.

Examples of (meth)acrylic acid esters of monohydric alcohols are methyl(meth)acrylate, ethyl(meth)acrylate butyl(meth)acrylate, and ethylhexyl(meth)acrylate.

Examples of corresponding esters with polyhydric alcohols are those with ethylene glycol, diethylene glycol, polyethylene glycol and trimethylol propane, diand mono-(meth)acrylic acid esters of glycerol, di(-meth)acrylic acid esters of tri- and tetraethylene glycol, of di-, tri-, tetra- and pentapropylene glycol, and di(-meth)acrylic acid esters of ethoxylated or propoxylated diphenylol propane. Other suitable esters are (meth)acrylic esters of alcohols derived from dihydroxymethyl-tricyclodecane or those produced from tricyclodecane, two alcoholic functions in the ring system being extended by reaction with dicarboxylic acids, such as maleic acid, or cyclohexane dicarboxylic acid, or terephthalic acid.

Reaction products of the diglycidylether of diphenylol propane with methacrylic acid and/or acrylic acid can also be used. Reaction products of diisocyanates or triisocyanates, for example tolylene diisocyanate, diphenylmethane diisocyanate, isophorone diisocyanate, trimerized tolylene isocyanate and the like, or prepolymers of polyisocyanates and polyfunctional counter components, particularly polyols, with hydroxyalkyl(meth)acrylates can also be used as polymerizable constituents.

However, it is also possible to use polymerizable monomers, such as vinylacetate, vinylhalides, for example vinylchloride, vinylbromide or vinylfluoride, styrene, divinylbenzene, crotonic acid and maleic acid esters or the so-called optionally styrenized unsaturated polyester resins. However, these last-mentioned compounds are generally used in reactive adhesives in only small quantities, for example in quantities of up to 25% by weight of the polymerizable constitutents.

Other suitable polymerizable compounds useful as component (a) include 2-acryloyloxyethyl-phosphate, 2-methacryloyloxyethyl phosphate, bis-2-acryloyloxyethyl phosphate, bis-2-methacryloyloxyethyl phosphate, tris-2-acryloyloxyethyl phosphate, tris-2-methacryloyloxyethyl phosphate and acid amides, such as for example dimethylene-bis-(meth)acrylamide, tetramethylene-bis-(meth)acrylamide, trimethylhexamethylene-bis-(meth)acrylamide, tri(meth)acryloyl-diethylene triamine, and the like.

According to the invention, particularly preferred are ethylenically unsaturated polymerizable components (a) which are solid at room temperature and which only melt above the $T_g$ of the mixture as a whole. Such components preferably have a number average molecular weight up to 20,000, more preferably up to 10,000. In addition, it may be of advantage to use components containing more than one double bond. It is particularly suitable to use, at least in part, compounds containing from 2 to 4 and more especially 2 and/or 3 polymerizable ethylenic double bonds. Corresponding solid monomer components can be derived in known manner from oligomeric polyesters, polyamides, polyethers, polyurethanes and/or polysiloxanes containing two or more terminal (meth)acryloyl groups or corresponding vinyl groups. However, comparable compounds can also be derived from corresponding alcohols and/or corresponding carboxylic acids as the structure-imparting basic framework.

Initiator component (b):

Suitable organoboron compounds which act as initiators are the known organoboron compounds activatable by oxygen, particularly atmospheric oxygen, or the corresponding organoboron compounds obtainable in known manner. However, it can be of significant advantage in accordance with the invention if the pure organoboron compound is not self-inflammable in air at normal temperature. This provides in particular for increased stability in storage without any reduction in effectiveness.

Suitable organoboron compounds are primarily boron alkyl and/or boron aryl compounds or the corresponding organoboron hydride compounds. Boron alkyl compounds or rather boron alkyl hydrides are a particularly suitable class of compounds. In a preferred embodiment, therefore, suitable organoboron compounds are compounds of the following types: $R_1R_2R_3B$, $R_1R_2BH$ and/or $R_1BH_2$, where the radicals $R_1$, $R_2$ and $R_3$ are hydrocarbon radicals, more especially alkyl radicals, which may also contain heteroatoms, more especially O, N and/or S. If at least two such organic radicals are present at the particular boron atom, they may in turn be closed to form a ring system. In a preferred embodiment, each hydrocarbon radical substituting the boron atom contains no more than 30 carbon atoms, preferably no more than 25 carbon atoms, more preferably no more than 15 carbon atoms, and most preferably no more than 12 carbon atoms.

Organoboron monohydride compounds, and dialkyl boromonohydrides can be used as the boron-containing initiator component, or can be used for the production of other boron-containing initiator components.

Typical representatives of boron compounds useful herein include, for example, 9-borabicyclo-[3.3.1]-nonane (9-BBN), diisopinocampheylborane, dicyclohexylborane, thexylborane (2,3-dimethyl-2-butyl)-borane, 3,5-dimethylborinane, and diisoamylborane. Of these compounds, the first mentioned, namely 9-borabicyclo [3.3.1]-nonane. (9-BBN),is preferred for practical reasons. The compounds disclosed above can be obtained, for example, from sodium borohydride and boron trifluoride using suitable olefins or diolefins. Diborane and ether, amine or sulfide complexes thereof can also be used for their production.

A survey of methods for producing suitable boron compounds can be found in the work by H. C. Brown, entitled "Organic Synthesis via Boranes", John Wiley & Sons (1975).

Other suitable initiators are simple trialkyl boranes and also hydroboration products of monoalkyl or, more especially, dialkyl boranes and olefins. Suitable olefins are, for example, ethene, propene, butene, isobutene, hexene, cyclohexene, vinylchloride, allylchloride, allylamine or (meth)acrylates, such as the corresponding methylesters, vinylacetate or crotonic acid esters. Of the group of suitable compounds of this type, the following are examples: trialkylboron compounds containing from 1 to 12 carbon atoms in the particular alkyl group, for example trimethylboron, triethylboron, tripropylboron, tributylboron or trihexylboron, although the more complex boronalkyl compounds containing, in particular, sterically hindered alkyl groups are more suitable. Examples of boronalkyl compounds such as these include diisopinocampheylbutylboron, thexylcyclohexyl-cyclopentylboron, thexyllimonylboron, trinorbornylboron, B-butyl-9-borabicyclo-[3.3.1]-nonane, B-isobutyl-9-borabicyclo-[3.3.1]-nonane, B-2-(4-cyclohexenyl)-ethyl-9-borabicyclo-[3.3.1]-nonane, B- cyclopropyl-9-borabicyclo-[3.3.1]-nonane, B-p-tolyl-9-borabicyclo-[3.3.1]-noname and B-tert.-butyl-3,5-dimethyl-borinane. However, it can also be of particular advantage to use the boronalkyl compounds described in European Patent Application No. 87,708 which contain boron hydride residues or organoboron residues on fatty acid and/or fatty alcohol esters and, more especially, reaction products of boron hydride and/or organoboron compounds containing at least one B-H bond with esters of olefinically unsaturated fatty acids and/or olefinically unsaturated fatty alcohols. In this case, preference is given to corresponding boron-containing reaction products of esters of polyhydric alcohols with unsaturated fatty acids and/or of polycarboxylic acids with unsaturated fatty alcohols.

The concept of the "intimate or homogeneous admixture" of the multicomponent mixtures of the invention and more especially the concept of the corresponding incorporation by mixing of the organoboron compounds in the other components of the multicomponent mixture applies preferably to mixtures which have only one phase at the storage temperature, of the type charcteristic of true solutions. It is precisely in this instance that the incorporation of the organoboron compounds by mixing is often free of problems. Where organoboron compounds containing at least one B-H group are used in the multicomponent mixture, a boron component such as this readily adds itself, where the melts are combined in the absence of oxygen, onto the ethylenic double bonds which are present in the component (a) and, if desired, which can also be present in the polymeric component (c). Accordingly, reactions of the type described, for example, in the above-mentioned European Patent application No. 85,836 and 87,708 take place.

Component (c):

The most important representatives of this class are polymer compounds which can be added to the multicomponent mixtures of the invention to produce certain properties in the uncured and/or fully reacted multicomponent mixture.

The polymer compounds are particularly suitable, for example, for adjusting the required solid phase for the multicomponent mixture to the predetermined $T_g$, particularly where liquid or low-melting polymerizable components are used as reaction component (a). In addition, the in-use behavior of the mixture can be influenced by choosing suitable polymer compounds. Thus, the polymers can be selected to act as reinforcing or elasticizing agents or as compounds having particular adhesive properties. Suitable polymer components are widely described in the literature and are known to those skilled in the art, including for example film-forming polymers, such as polymethyl(meth)acrylate, polychloroprene, chlorosulfonated polyethylene, nitrile rubbers and/or polyurethanes. However, polyesters, polyamides, polyethers and/or polysiloxanes are also suitable.

These polymer components (c) are preferably homogeneously miscible with the unsaturated reactive components (a) and are solid up to at least 50° C. and preferably up to 60° C. After softening and/or melting, their melt viscosity in the working temperature range of up to 250° C. and preferably in the range of from 90° to 200° C. is up to 100,000 mPas, preferably to 50,000 mPas. In general, the viscosity of the melt decreases with decreasing temperature. It may be of advantage to use polymers which, in the above commercially practicable temperature range, have viscosities of the melt phase of up to 10,000 mPas and, more especially, in the range of from 500 to 5000 mPas.

Since it is precisely these polymer components which very significantly affect the spreading behavior or rather the flow behavior at elevated temperature of the mixture as a whole, unless they are used in very small quantities, particular significance is attributed to their choice and to their coordination with the other components of the mixture. Melt viscosities for the mixture as a whole at temperatures up to about 200° C. of at most 10,000 mPas are particularly appropriate for the field of hotmelt adhesives. An important factor in this connection is that the rheology of the melt mixture is not affected over a short period in the sense of increasing thickening to the point of non-meltability by the aerobically initiated hardening reaction which begins at the same time.

Component (c) may be inert as such to the other components of the mixture and, hence, particularly to the organoboron compounds (b) as well. Information on polymer compounds of this type can be found in European Patent Application No. 78,994. However, the polymer compounds may also contain olefinic double bonds which are then available for a possible addition of B-H groups during the melting process. These olefinic double bonds can be present both in the chain and also in lateral substituents (side chains) on the main chain. Both arrangements are possible. If polymerizable double bonds capable of participating in the hardening reaction are present in side chains, polymer components (c) of this type are also chemically incorporated in the cured or rather crosslinked reaction product.

This polymer component and the multicomponent mixtures of the invention as a whole are governed by the important requirement that the individual components should be inert to one another at room temperature and up to the critical range of the $T_g$ of the mixture as a whole. In addition, the constituents of the mixture should also be inert or substantially inert in their behavior in the melt in the absence of oxygen, excluding the possible reactions of organoboron compounds with the olefinic bonds in the reaction components (a) and the polymer compounds (d), as indicated above.

Suitable polymer compounds have a number average molecular weight in the range of from 500 to 5,000,000 and more especially in the range of from 1,000 to 3,000,000.

Component (d):

Published European Patent Application No. 51,796 describes the double effect of organoboron compounds, particularly boron alkylene compounds, on ethylenically unsaturated compounds. The organoboron compounds have a polymerization-initiating effect, even in the complete absence of traces of oxygen. However, this polymerization process takes place very much more slowly than the oxygen-initiated radical reaction-initiating process. The first-mentioned reaction mechanism is based on an anionic initiation process which may be activated by an increase in temperature.

To increase the stability of the multicomponents mixtures of the invention in storage, it may be desirable to add inhibitors or stabilizers against anionic and/or against radical polymerization to suppress unwanted reactions such as these. Suitable anionic polymerization inhibitors or rather stabilizers are, in particular, compounds of the type which are also suitable for stabilizing α-cyanoacrylic acid esters, for example acidic gases, such as $SO_2$, $NO_2$, NO, $CO_2$, HCl and HF. Phosphoric acid, boric acid, boric acid esters, sulfonic acid and sultones, carboxylic acids, such as (meth)acrylic acid, acetic acid, trichloroacetic and trifluoroacetic acid, carboxylic acid anhydrides or alcohols, such as for example hydroxyethulmethacrylate, phosphorus pentoxide, can be employed herein as inhibitors or as auxiliary inhibitors against premature hardening of the mixture.

In many instances, it can be of advantage to use as anionic polymerization inhibitor components which are reactive to radical polymerization and, hence, are incorporated in the hardening reaction mixture. Suitable components of this type are, in particular, free carboxylic acids containing olefinic double bonds, i.e. in particular acrylic acid and/or methacrylic acid. Accordingly, their use in the "one-component" reactive adhesives of the invention is of significance in many respects. It is well known that free carboxyl groups in adhesives improves their adhesive strength while, at the same time, the free acids stabilize the reactive one-component mixtures against undesirable anionic polymerization.

Stability can also be favorably influenced by compounds acting as complexing agents in the mixture, such as amines and esters, for example pyridine, propylamine, butylamine, allylamine, diisopropylamine, N,N-dimethyltoluidine, benzoic acid methylester or ethylester or anisic acid methylester or ethylester.

In general, it is also important to prevent premature radical polymerization. Suitable radical polymerization inhibitors include hydrides such as sodium borohydride, lithium aluminium hydride, and calcium hydride. Other suitable radical polymerization inhibitors are cumene, hydroquinone, 2,6-di-tert.-butyl-p-cresol, 2,6-di-tert.-butyl-4-methoxyphenol, bis(2-hydroxy-3-tert.-butyl-5-methylphenyl)-methane, bis-(3,5-di-tert.-butyl-4-hydroxyphenyl)-methane, galvinoxyl, bis-(2-hydroxy-3-tert.-butyl-5-methylphenyl)-sulfide, bis-(3-tert.-butyl-4-hydroxy-5-methylphenyl)-sulfide, diphenylamine, N,N'-diphenyl-p-phenylene diamine, phenothiazine, 2-phenyl-benzimidazole, aniline, dinitrobenzene, 2-nitro- -naphthol, tetraphenylethylene, and triphenylmethane.

Powerful antioxidants are particularly suitable for effectively preventing radical polymerizaton. Examples are galvinoxyl, copper(II) dibutyldithiocarbamate, phenothiazine and zinc diethyldithiocarbamate. In another preferred embodiment of the invention, however, this final stabilization against radical polymerization is achieved by the substantially quantitative elimination of unavoidably entrained oxygen traces by means of boron hydride compounds, particularly by addition of organoboron hydrides, such as dialkyl boron monohydrides. By virtue of its high reductiveness, the boron hydride compound destroys any traces of oxygen present substantially quantitatively. The choice of the quantity of organoboron hydride compounds added is not critical. They may be added in excess. The excess of organoboron hydride reacts with the olefinic components of the reaction mixture to form the boronalkyl compound which in turn performs the function of the initiator.

Component (e):

According to the prior art, hotmelt adhesives, cast resins, molding compounds or similar mixtures may contain a variety of additives depending upon the proposed application, including for example fillers, dyes and/or pigments. Fillers are generally undissolved in the mixture, even in its molten state; instead they are present in finely divided form and serve to adapt the properties of the material to the proposed application and/or to reduce the consumption of other ingredients in the compositions of the invention. The finely divided fillers can be organic and/or inorganic. They can be inert, but can also have quality-improving effect, particularly where selected polymer types are used, improving such properties as, for example, hardening strength, and/or elasticity or rater elongation. Known examples of fillers include inorganic materials, such as calcium carbonate, gypsum, alumina, silica, chalk, kaolin, potassium sulfate, magnesium silicates or mica powder. Known organic fillers are, for example, sawdust, cellulose powder and the like.

Pigments can also be added as fillers, which also can enable color values to be adjusted in the reactive compositions of the invention. Dyes soluble in the melt of the reactants or in at least one component can be used for the same purpose.

Other known additives which can be used in component (e) are, for example, levelling agents or flow promoters of which the function is to promote levelling of the melt on application and, hence, to neutralize any unevenness, ridging, bubble formation, and the like. Levelling agents suitable for the purposes of the invention include non-reactive components having a defined melting point above about 45° C. and, more especially, above 60° C. which, on melting, form a thinly liquid phase which mixes with the melt phase of the main reactants. The solid state at room temperature and higher temperatures required in accordance with the invention is guaranteed in this way while, at the same time, the levelling or rather the flow of the multicomponent mixture after the $T_g$ has been exceeded is promoted.

Conversely, undesirable, premature softening of the mixture can be counteracted by the addition of known thickeners. The extent of the reaction under process conditions can be influenced by using known accelerators for the crosslinking reaction.

The quantitative ratios in which components (a) to (e) are used in the composition of the invention are largely determined by the particular components selected and by the purpose for which it is intended to use the multicomponent mixture. In the following guidelines, the particular quantitative ranges representing percentages by weight are based on the mixture as a whole, unless otherwise indicated.

Reactive component (a), containing at least one polymerizable ethylenic double bond, should be present in quantities of at least 5% by weight, although— given as it were a tailored constitution—they can also make up virtually the entire weight of the multicomponent mixture of the invention so that they can be present in quantities of up to 99% by weight. The content of component (a) in the multicomponent mixture preferably amounts to between 5 and 95% by weight, and more preferably to between 5 and 50% by weight.

Where reaction component (a) is liquid at room temperature, it is always used in admixture with thickeners, in which case polymer component/c) is generally used. In situations such as these, it can be of advantage to use from 5 to 30% by weight and more especially from 10 to 25% of liquid reactive component (a).

Given adequate reactivity of the mixture as a whole, component (b), which initiates the polymerization of the ethylenically unsaturated compounds, is active in only very small quantities, so that 0.05% by weight is a suitable lower limit for the addition of the organoboron compounds of component (b). A range of from 0.1 to 30% by weight can be particularly suitable, with a range of from 0.1 to 10% by weight being especially preferred.

The use of polymer component (c) is not essential to the compositions of the invention, provided the compositions have the requisite $T_g$ in the absence of component/c). However, this polymer component can make up the predominant percentage of the multicomponent mixture of the invention. Thus, component (c) can be present, for example, in quantities of from 0 to 95% by weight and more especially in quantities of from 0 to 90% by weight. In general, it is advisable in the field of hotmelts to use polymer component (c) in quantities of from 20 to 80% by weight for obtaining suitable hotmelt properties.

Where reactive component (a) is liquid at room temperature, it is generally advisable to use polymer component (c) in quantities of from 50 to 95% by weight and more especially in quantities of from 60 to 90% by weight. Polymer component (c) can be left out altogether where a material which is solid at room temperature and at sufficiently elevated temperatures, for example the above-mentioned reactive derivatives of oligomers with the corresponding temperature/phase behavior, is present as reactive component (a).

Anionic polymerization and/or radical polymerization inhibitors in component (d) can be used, although they are not essential. In this case, too, the stabilizing effect of the solid phase is exerted in conjunction with the increased $T_g$ of the mixture as a whole. Where inhibitors such as these are used, they can be present in quantities of from 0 to 10% by weight and more especially in quantities of from 0 to 5% by weight.

Standard additives used in component (d) are used in desired amounts and can make up a considerable percentage of the mixture as a whole. Thus, fillers for example can be present in quantities of from 50 to 60% by weight. In the case of hotmelts, the component (d) generally makes up no more than 40% by weight of the mixture as a whole, smaller quantities—up to 20% by weight and preferably up to 10% by weight—generally being preferred.

In addition, it can be of particular advantage in the field of hotmelts for the multicomponent mixtures to contain reactive component (a) together with polymer component (c) in quantities of at least 50% by weight and preferably in quantities of at least 80% by weight.

In another embodiment, the invention relates to the production of the new reactive multicomponent mixtures. In the preferred embodiment, at least one of the constituents of the mixture is present in melt form, this molten phase having to be present in such a quantity that a liquid phase is available in a sufficient amount for the incorporation by mixing of the organoboron compounds. To this end, it is best initially to combine components (a) and (c) to (e) with one another in the absence of the organoboron compounds (b). The melt is freed from oxygen as far as possible by preferably repeated evacuation and purging with an oxygen-free inert gas, for example nitrogen. The organoboron components (b) is then introduced into the melt in an inert gas atmosphere and thoroughly mixed therewith and, more especially, dissolved therein. The mixture is then left to harden with cooling in the absence of oxygen. The fluid melt may be introduced beforehand, again in the absence of oxygen, into the packs required for retailing and/or use. As discussed above, however, it is also possible to subject the solidified multicomponent mixture, providing it is sufficiently stable to atmospheric oxygen, to further processing steps at room temperature, for example to size reduction and/or compression forming or molding.

The invention will be illustrated but not limited by the following examples.

EXAMPLES (a) General procedure for producing aerobically curing hotmelts.

In a three-necked flask, the polymer and monomer components were combined and heated with stirring under nitrogen to about 200° C. After the formation of a homogeneous melt, the flask was evacuated three times (0.1 Torr) and, on each occasion, was subsequently purged with nitrogen. Thereafter, the boron alkyl was introduced into the melt in a stream of argon and mixed therewith for about 15 minutes at 200° C. The mixture was left to cool under nitrogen in the sealed reaction vessel. The solidified melt was quenched with liquid nitrogen in order to facilitate size reduction.

The compositions of the aerobically curing hotmelts are shown in Tables 3 to 5.

(b) General procedure for producing the test specimens.

Sand-blasted and degreased iron sheets pretreated in accordance with DIN 53 281/53 283 were heated on an aluminum block mounted on a heating plate adjusted via a contact thermometer to between 200° and 220° C. and were then scattered with the hotmelts described in Tables 1 to 3. After a homogeneous melt had formed over the surface to be bonded, a second preheated iron sheet was bonded thereto with a single overlap and fixed. The bonding process generally took about 2 minutes.

Iron sheets 25×100 mm, sand-blasted and degreased
 Bonding surface: 10 mm overlap depth, corresponding to an area of 250 mm²
Tensile shear strength test: after storage for 24 hours at room temperature in accordance with DIN 53 281/52 282 at the measuring temperature indicated (c) General procedure for measuring thermal stability under load.

Sand-blasted and degreased iron sheets bonded over a total area of 2.5×2.5 cm by the method described in (b) were tested as follows after storage for 3 days at room temperature:

The bonded iron sheets were vertically suspended in a drying cabinet and a weight of 1320 g attached thereto. Thereafter the temperature was increased by 5° C. at 10 minute intervals to a temperature at which the bond is broken (= thermal stability under load).

(1320 g load=0.02 N/mm²)

The results of the test are shown in Tables 3 to 5.

(d) Production of monomers A and B. (see Tables 3 to 5)

Alcohol, lactide and, per mole of lactide, 2.3 ml of a solution of 2.5 mg of $SnCl_2$ per ml of ether were combined in a 500 ml three-necked flask equipped a KPG stirrer with a PTFE blade, a thermometer, a nitrogen inlet and a distillation bridge with a condenser, receiving flask and bubble counter. The apparatus was evacuated and purged with nitrogen four times. The components were heated over a period of 1 hour to 190°-195° C. in a gentle stream of nitrogen. They were then left reacting for 3 to 3.5 hours at 190° to 195° C. and packed while still hot.

TABLE 1

Preliminary stages of monomers A and B:

| Test Number | Adducts alcohol (per mole) | Adducts lactide (moles) | Product Properties consistency color | Product Properties hydroxyl number |
|---|---|---|---|---|
| a | ethylene glycol | 6 | highly viscous colorless | 99 |
| b | glycerol | 6 | highly viscous colorless | 151 |

Preparation of monomers A and B:

The oligohydroxycarboxylic acids containing terminal hydroxyl groups (see Table 4) and 1.1 equivalent of methacrylic acid per hydroxyl group were introduced into a three-necked flask equipped with a stirrer and water separator. At the same time, equal parts by weight of toluene and 2% by weight of p-toluene sulfonic acid and 2% by weight of hydroquinone, based on methacrylic acid, were added.

The mixture was heated to boiling temperature with rapid stirring and the water of reaction formed was separated off in the water separator.

When after a reaction time of 5 hours, less than 80% by weight of the theoretically expected water of reaction has been eliminated, another 20% of the quantity of methacrylic acid originally added were added with 2% by weight of p-toluene sulfonic acid and 2% by weight of hydroquinone and the reaction continued. The reaction is over when about 85% of the expected water of reaction has formed. After cooling, the reaction product was introduced into twice the volume of ethanol and filtered. The clear ethanolic solution was concentrated in a rotary evaporator to 1 quarter of its original volume, poured into the same quantity of water and neutralized with sodium hydrogen carbonate. The organic phase was separated off, the aqueous phase was extracted by shaking with toluene, the organic phases were combined, washed three times with water and dried over sodium sulfate. The solvent was distilled off at room temperature first in a rotary evaporator and then at $10^{-4}$ Torr. The composition of the mixtures and the properties of the polymerizable oligomers are shown in Table 2.

TABLE 2

Preparation of monomers A and B:

| Example | Adduct diol of Example | Yield of water of reaction | Consistency and color |
|---|---|---|---|
| A | a | 85% | homogeneous, highly viscous, brown |
| B | b | 85% | homogeneous, highly viscous, brown |

(e) Tabular comparison of Example 1 (comparison) with Examples 2 to 9 (according to the invention). The percentages of the formulation constituents polymer, monomer and hardener have the following reference values:
% polymer and % monomer are percentages by weight, based on the weight of the mixture of polymer and monomer.
% hardener means percentage by weight of hardener, based on the weight of the monomers used.

TABLE 3

Synopsis of formulations and properties of aerobically curing hotmelts

| Example No. | Formulation constituents Polymer[1] | Formulation constituents monomer[2] | Formulation constituents hardener[3] | Properties tensile shear strengths of Fe—Fe bonds [Nmm$^{-2}$] separation temperature 20° C. | 60° C. | 80° C. | Thermal stability under load |
|---|---|---|---|---|---|---|---|
| 1 | 100% | — | — | 16 | 5.6 | 1.6 | 110° C. |
| 2 | 80% | PEG 400 DMA 20% | 5% | 17.1 | 2.6 | 0.7 | 140° C. |
| 3 | 80% | A 20% | 5% | 22.4 | 5.5 | 1.3 | 115° C. |
| 4 | 80% | B 20% | 5% | 14.3 | 6.6 | 2.2 | 110° C. |
| 5 | 80% | Diacryl 101 2% | | 25.4 | 8.7 | 2.7 | 195° C. |
| 6 | 80% | Diacryl 101 20% | 6% | 22.9 | 9.6 | 1.0 | 180° C. |
| 7 | 80% | Diacryl 101 | 10% | 19.5 | 11.4 | 2.2 | 160° C. |
| 8 | 90% | Diacryl 101 10% | 10% | 30.6 | 12.1 | 3.9 | 150° C. |
| 9 | 70% | Diacryl 101 | 10%[4] | 9.0 | 7.3 | 2.8 | 155° C. |

Curing conditions of the test specimens: 24 h/20° C.
[1]PMMA, polymethylmethacrylate having a softening point of 110° C. ("Plexigum MB 319", a product of the ROHM company, Darmstadt)
[2]PEG 400 DMA: bis-methacrylate of a polyethylene glycol having a molecular weight of 400 (a commercial product of the ROHM company, Darmstadt) Diacryl 101: bis-methacrylate based on bisphenol A (a commercial product of the AKZO company, Duren) A, B: bis-methacrylate based on polyactic acid, see d) above.
[3]9-BBN (9-borabicyclo-[3.3.1]-nonane)
[4]product is not stable in storage in air.

TABLE 4

Synopsis of formulations and properties of aerobically curing hotmelts

| Example No. | Formulation constituents Polymer[1] | Formulation constituents monomer[2] | Formulation constituents hardener[3] | Properties tensile shear strengths of Fe—Fe bonds [Nmm$^{-2}$] separation temperature 20° C. | 60° C. | 80° C. | Thermal stability under load |
|---|---|---|---|---|---|---|---|
| 1 | 100% | — | — | 14.8 | 5.0 | 1.5 | 115° C. |
| 2 | 80% | PEG 400 DMA 20% | 5% | — | — | — | 145° C. |
| 3 | 80% | A 20% | 5% | 17.9 | 5.7 | 1.6 | 115° C. |
| 4 | 80% | B 20% | 5% | 14.2 | 6.8 | 2.0 | 115° C. |
| 5 | 80% | Diacryl 101 20% | 2% | 14.2 | 11.5 | 6.3 | 200° C. |
| 6 | 80% | Diacryl 101 20% | 6% | 13.2 | 13.1 | 5.3 | 145° C. |
| 7 | 80% | Diacryl 101 20% | 10% | 22.6 | 10.1 | 3.3 | 165° C. |

TABLE 4-continued
Synopsis of formulations and properties of aerobically curing hotmelts

| Example No. | Formulation constituents | | | Properties tensile shear strengths of Fe—Fe bonds [Nmm$^{-2}$] separation temperature | | | Thermal stability under load |
| --- | --- | --- | --- | --- | --- | --- | --- |
| | Polymer[1] | monomer[2] | hardener[3] | 20° C. | 60° C. | 80° C. | |
| 8 | 90% | Diacryl 101 10% | 10% | 30.8 | 13.3 | 4.3 | 155° C. |
| 9 | 70% | Diacryl 101 30% | 10%[4] | 9.0 | 8.6 | 4.7 | 160° C. |

Curing conditions of the test specimens: 24 h/60° C.

TABLE 5
Synopsis of formulations and properties of aerobically curing hotmelts

| Example No. | Formulation constituents | | | Properties tensile shear strengths of Fe—Fe bonds [Nmm$^{-2}$] separation temperature | | |
| --- | --- | --- | --- | --- | --- | --- |
| | polymer[1] | monomer[2] | hardener[3] | 20° C. | 60° C. | 80° C. |
| 1 | 100% | — | — | 14.5 | 5.0 | 1.1 |
| 2 | 80% | PEG 400 DMA 20% | 5% | — | — | — |
| 3 | 80% | A 20% | 5% | 16.6 | 4.1 | 1.0 |
| 4 | 80% | B 20% | 5% | 15.1 | 5.0 | 0.8 |
| 5 | 80% | Diacryl 101 20% | 2% | 20.8 | 7.6 | 2.5 |
| 6 | 80% | Diacryl 101 20% | 6% | 20.8 | 10.0 | 1.1 |
| 7 | 80% | Diacryl 101 20% | 10% | 19.3 | 10.4 | 2.5 |
| 8 | 90% | Diacryl 101 10% | 10% | 30.5 | 9.5 | 2.7 |
| 9 | 70% | Diacryl 101 30% | 10%[4] | 8.8 | 5.1 | 1.8 |

Curing conditions: storage for 7 days at 20° C.

What is claimed is:

1. A solid composition comprising a mixture of
   (a) a reactive component containing at least one compound having at least one polymerizable ethylenic double bond;
   (b) a component for initiating polymerization containing at least one organoboron compound; and
   (c) one or more polymers having a melting or softening temperature in the range of from about 50 to about 350° C.,
wherein the composition is solid at room temperature, stable on storage in solid form even in the presence of air, becoming spreadable or fluid under the influence of heat, aerobically curable by polymerization in such heated spreadable or fluid condition and has a glass transition temperature $T_g$ above about 45° C.

2. A solid composition according to claim 1 wherein the composition also contains one or more of an anionic and/or radical polymerization inhibitor or stabilizer.

3. A solid composition according to claim 1 wherein the composition also contains one or more of a thickener, a flow promoter, a levelling aid, an accelerator, a filler, a dye, and a pigment.

4. A solid composition according to claim 2 wherein the composition also contains one or more of a thickener, a flow promoter, a levelling aid, an accelerator, a filler, a dye, and a pigment.

5. A solid composition according to claim 1 wherein the composition has a glass transition temperature $T_g$ above about 60° C.

6. A solid composition according to claim 1 wherein component (b) is solid at room temperature.

7. A solid composition according to claim 6 wherein solid component (b) is a boron alkyl or boron aryl compound.

8. A solid composition according to claim 1 wherein component (b) is one or more organoboron compounds having at least one alkyl B-C bond.

9. A solid composition according to claim 1 wherein component (b) contains at least one dialkyl borohydride and/or trialkyl boron compound, and wherein at least two such alkyl groups can together form a ring system.

10. A solid composition according to claim 1 wherein reactive component (a) is a solid which softens or melts above about 45° C.

11. A solid composition according to claim 1 wherein reactive component (a) is a solid which softens or melts above about 60° C.

12. A solid composition according to claim 1 wherein component (a) contains at least one compound having a polymerizable vinyl and/or (meth)acryloyl group.

13. A solid composition according to claim 12 wherein the at least one compound is one or more of an oligomeric polyester, a polyamide, a polyurethane, a polyether, a polysiloxane, a monohydric alcohol, a polyhydric alcohol, and a carboxylic acid.

14. A solid composition according to claim 1 wherein component (a) contains one or more of a monofunctional (meth)acrylic acid, a polyfunctional (meth)acrylic acid, and a vinyl compound, wherein the above have a number average molecular weight of up to about 20,000.

15. A solid composition according to claim 14 wherein said number average molecular weight is up to about 10,000.

16. A solid composition according to claim 1 wherein the one or more polymers of component (c) are homogeneously miscible with reactive component (a) and have a melt viscosity of up to about 100,000 mPas at a temperature in the range of from about 60° C. to about 250° C.

17. A solid composition according to claim 16 wherein said melt viscosity is up to about 50,000 mPas.

18. A solid composition according to claim 1 wherein the at least one polymer is a non-reactive component of the composition.

19. A solid composition according to claim 1 wherein the at least one polymer is reactive when the composition is cured through olefinic double bonds present therein.

20. A solid composition according to claim 19 wherein the olefinic double bonds are present in the main chain and/or side chains of the polymer.

21. A solid composition according to claim 1 wherein the composition has a melt viscosity of from about 500 to about 10,000 mPas at a temperature above about 60° C.

22. A solid composition according to claim 21 wherein the composition has a melt viscosity of from about 500 to about 5,000 mPas.

23. A solid composition according to claim 1 wherein the composition has a melt viscosity of from about 500 to about 10,000 mPas at a temperature of from about 90° to about 200° C.

24. A solid composition according to claim 1 wherein component (a) is present in from about 5 to about 99% by weight, based on the weight of the composition.

25. A solid composition according to claim 24 wherein component (a) is present in from about 5 to about 95% by weight.

26. A solid composition according to claim 1 wherein component (b) is present in from about 0.05 to about 30% by weight, based on the weight of the composition.

27. A solid composition according to claim 26 wherein component (b) is present in from about 0.01 to about 10% by weight.

28. A solid composition according to claim 1 wherein component (c) is present in an amount up to about 95% by weight, based on the weight of the composition.

29. A solid composition according to claim 28 wherein said amount is from about 20 to about 80% by weight.

30. A solid composition according to claim 1 wherein component (a) plus component (c) are present in the composition in at least about 50% by weight.

31. A solid composition according to claim 30 wherein component (a) plus component (c) are present in at least about 80% by weight.

32. A solid composition according to claim 1 wherein component (a) is liquid at room temperature and is present in from about 10 to about 30% by weight of the composition, and component (c) is solid and is present in from about 50 to about 95% by weight of the composition.

33. A solid composition according to claim 32 wherein component (c) is present in from about 60 to about 90% by weight.

34. A process for preparing a solid composition comprising a mixture of
(a) a reactive component containing at least one compound having at least one polymerizable ethylenic double bond;
(b) a component for initiating polymerization containing at least one organoboron compound;
(c) at least one polymer having a melting or softening temperature in the range of from about 50 to about 350° C.; and, optionally
(d) at least one anionic and/or radical polymerization inhibitor or stabilizer;
(e) at least one of a thickener, a flow promoter, a levelling aid, an accelerator, a filler, a dye, and a pigment,
comprising the steps of
A. forming a mixed melt of component (a) and (c), and, when present, components (d), and (e);
B. removing substantially all of any oxygen present in the melt;
C. mixing component (b) into the melt in the absence of oxygen; and
D. lowering the temperature of the melt to solidify the melt in the absence of oxygen.

35. A process according to claim 34 wherein step B. is carried out by repeated evacuation and purging with an oxygen-free inert gas.

36. A process according to claim 34 wherein step D. is carried out by allowing the melt to harden at room temperature in the absence of oxygen.

37. A method for forming a heat-resistant bond between two surfaces comprising applying the curable composition of claim 1 as a melt to the surfaces to be bonded and aerobically curing the composition.

38. The composition of claim 10, wherein component (a) is a derivative of (meth) acrylic acid or a derivative of (meth)acrylic acid with up to 25% by weight, based on the weight of polymerizable components, of a polymerizable monomer other than said derivative, and the at least one polymer is present in an amount of from about 20 to 80% by weight of the composition.

* * * * *